US 7,835,867 B2

(12) United States Patent
Richman et al.

(10) Patent No.: US 7,835,867 B2
(45) Date of Patent: Nov. 16, 2010

(54) DETERMINATION OF THE BEARING FROM A GEOPHONE TO A SEISMIC SOURCE

(75) Inventors: Michael S. Richman, Bedford, MA (US); George Succi, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 259 days.

(21) Appl. No.: 12/211,564

(22) Filed: Sep. 16, 2008

(65) Prior Publication Data

US 2010/0070183 A1     Mar. 18, 2010

(51) Int. Cl.
*G06F 19/00*     (2006.01)

(52) U.S. Cl. ...................................... 702/17

(58) Field of Classification Search ................. 702/10, 702/13, 14, 182–185, 188, 17
See application file for complete search history.

(56) References Cited

U.S. PATENT DOCUMENTS

| | | | |
|---|---|---|---|
| 4,001,771 A | 1/1977 | Amrine et al. | |
| 6,076,045 A * | 6/2000 | Naville | 702/10 |
| 6,690,321 B1 | 2/2004 | Blatt | |
| 7,034,716 B2 | 4/2006 | Succi et al. | |
| 7,154,275 B2 | 12/2006 | Zank et al. | |

OTHER PUBLICATIONS

"Source Location and Tracking Capability of a Small Seismic Array", CRREL Report 96-8, Jun. 1996.
"A Three Channel Geophone Amplifier", printed Aug. 26, 2008 from http://www.vaxman.de/projects/geophon_amplifier/geophon_amplifier.html.
"Footstep Detection and Tracking", Succi, et al, Proceedings of SPIE vol. 4393 (2001).

* cited by examiner

*Primary Examiner*—Edward Raymond
(74) *Attorney, Agent, or Firm*—Finch & Maloney PLLC; Neil F. Maloney

(57) ABSTRACT

Techniques are disclosed for determining the bearing from a three-axis geophone to a seismic source, such as a person or other man-made seismic source. In one embodiment, the techniques are implemented as a method that includes receiving outputs from a three-axis geophone (x axis, y axis and z axis outputs), computing a magnitude signal based on the x and y axis outputs, determining locations of each local peak in the magnitude signal, computing a bearing estimate for each peak, and computing a median of the bearing estimates. The resulting median bearing is an estimate of the bearing from the geophone to a target seismic source. In one such case, computing the magnitude signal based on the x and y axis outputs is performed in response to detecting the target seismic source in the phase-shifted z axis output.

20 Claims, 3 Drawing Sheets

DETERMINATION OF THE BEARING FROM A GEOPHONE TO A SEISMIC SOURCE

STATEMENT OF GOVERNMENT INTEREST

The invention was made with United States Government support under contract DAAE30-03-C-1094 awarded by the Army, and the United States Government has certain rights in this invention.

FIELD OF THE INVENTION

The invention relates to seismic sensor technology, and more particularly, determining the bearing from a three-axis geophone to a seismic source.

BACKGROUND OF THE INVENTION

A geophone is a known device that converts seismic energy (movement or displacement) to an electrical signal having a voltage that is proportional to the velocity of the seismic energy. They can be used, for example, to detect and quantify movement or displacement of the ground (earthquakes) or machine vibrations. They can also be used in oil exploration and mining, where a man-made seismic stimulus is applied to the earth, and a geophone is used to 'read' the reflection or response to the seismic stimulus, which may indicate the presence of oil or a specific mineral deposit (generally referred to as seismic surveying or prospecting).

U.S. Pat. No. 7,034,716, titled "Passive Real-Time Vehicle Classification System Utilizing Unattended Ground Sensors" describes one application of a geophone, for determining the type of a vehicle traversing terrain from acoustic and seismic noise emitted therefrom.

Although seismic energy is generally three-dimensional in nature, a geophone is typically configured to respond to single dimension. However, some applications require the full wave of seismic energy to be detected, and in such cases, a multi-component geophone can be used, where individual geophones are deployed for each dimension of interest. For instance, a three-axis geophone detects seismic energy in three mutually orthogonal dimensions: x, y and z directions.

SUMMARY OF THE INVENTION

One embodiment of the present invention provides a method for computing the bearing from a three-axis geophone to a seismic source. The method includes receiving outputs from a three-axis geophone, including x axis, y axis and z axis outputs, and computing a magnitude signal based on the x and y axis outputs. The method further includes determining locations of each local peak in the magnitude signal, and computing a bearing estimate for each peak. The method further includes computing a median of the bearing estimates, wherein the resulting median bearing is an estimate of the bearing from the geophone to a target seismic source. In one particular such embodiment, the x axis, y axis and z axis outputs are analog, and receiving the outputs from a three-axis geophone further includes digitizing each of the x, y, and z outputs. In another particular such embodiment, computing a magnitude signal based on the x and y axis outputs is performed in response to first detecting the target seismic source in the z axis output. The method may include filtering each of the x, y, and z outputs to remove noise. In one such case, the method includes phase shifting the filtered z axis output. The method may continue with projecting each filtered x and y axis output onto the phase-shifted z axis output.

The method may continue with applying a moving average filter to each of the projected x and y axis outputs. In one such case, computing a magnitude signal based on the x and y axis outputs includes computing the magnitude signal based on the moving average filtered x and y axis outputs, wherein computing a magnitude signal is performed in response to first detecting the target seismic source in the phase-shifted z axis output.

Another embodiment of the present invention provides a machine readable medium encoded with instructions that when executed by a processor, cause that processor to carry out a process for computing the bearing from a three-axis geophone to a seismic source. The process may include, for example, functionality similar to the methodology previously described.

Another embodiment of the present invention provides a system for computing the bearing from a three-axis geophone to a seismic source. The system includes a filter for receiving outputs from a three-axis geophone, including x axis, y axis and z axis outputs, and filtering each of the x, y, and z outputs to remove noise. The system further includes a phase shifter for phase shifting the filtered z axis output, and a projector for projecting each filtered x and y axis output onto the phase-shifted z axis output. The system further includes a moving average filter for filtering each of the projected x and y axis outputs, and a magnitude compute module for computing a magnitude signal based on the moving average filtered x and y axis outputs. The system further includes a peak finder for determining locations of each local peak in the magnitude signal, and a bearing compute module for computing a bearing estimate for each peak. The system further includes a bearing estimate compute module for computing a median of the bearing estimates, wherein the resulting median bearing is an estimate of the bearing from the geophone to a target seismic source. In one particular such embodiment, the x axis, y axis and z axis outputs are analog, and the system further comprise an analog-to-digital converter for digitizing each of the x, y, and z outputs. The system may further include a detector for detecting the target seismic source in the phase-shifted z axis output, wherein in response to detecting a target seismic source in the phase-shifted z axis output, the magnitude compute module is enabled to compute a magnitude signal based on the moving average filtered x and y axis outputs. In another particular such embodiment, the filter for filtering each of the x, y, and z outputs to remove noise includes three a bandpass filter for each of the x, y, and z outputs.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Techniques are disclosed for determining the bearing from a three-axis geophone to a seismic source, such as a person or other man-made seismic source. As is known, the bearing to an object generally refers to the horizontal angle between the direction of the object and that of true north, or even more generally, the direction to the object relative to a given location.

The techniques can be used in conjunction with numerous types of seismic sensors that provide seismic activity data, and may be integrated directly into the housing of the sensor itself, or otherwise operatively coupled to the sensor so as to receive the multidimensional outputs. The techniques can be implemented in hardware, software, or a combination thereof.

Numerous applications will be apparent in light of this disclosure, including personnel detection and tracking. In any such cases, the ability is provided to passively determine position information of personnel or other seismic source using a low cost, low power sensor.

System Architecture

Figure 1:
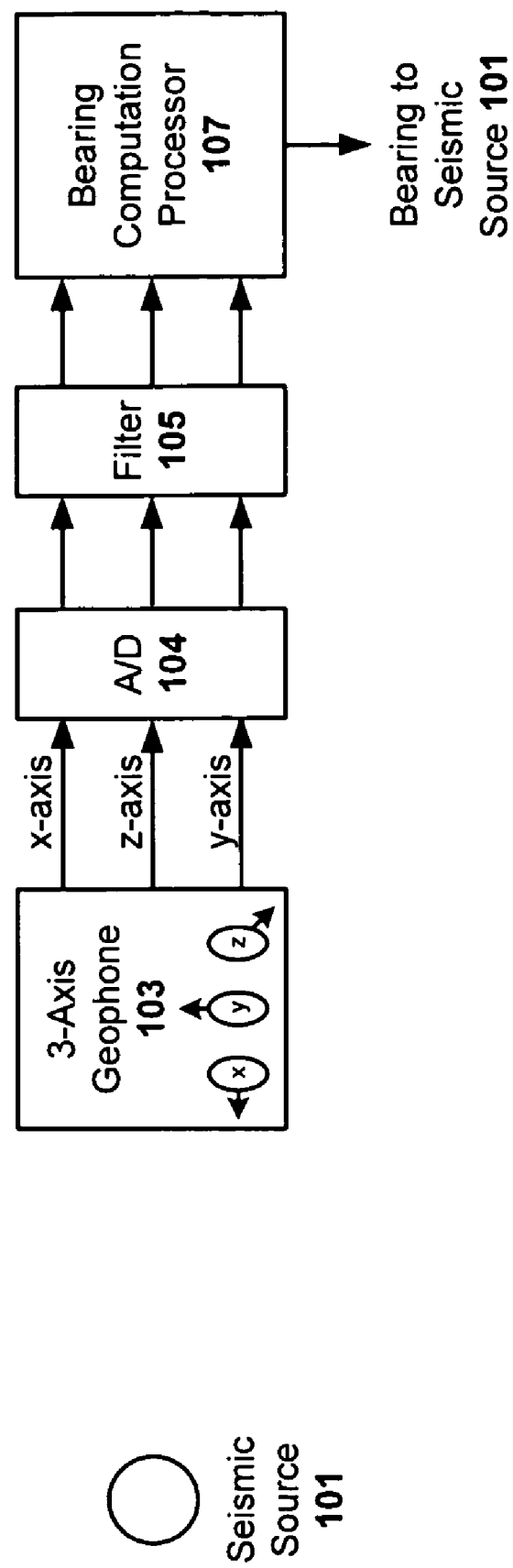
FIG. 1 illustrates a system for computing the bearing from a three-axis geophone to a seismic source, configured in accordance with an embodiment of the present invention.

FIG. 1 illustrates a system for computing the bearing from a three-axis geophone to a seismic source, configured in accordance with an embodiment of the present invention.

As can be seen, the system includes a three-axis geophone 103 having its outputs operatively coupled to an analog-to-digital converter (A/D) 104, which converts each of the analog outputs of the geophone 103 to its digital equivalent. These digital signals are then operatively coupled to filter 105, which is configured to filter out noisy areas of the geophone frequency response. The filtered outputs of filter 105 are operatively coupled to a bearing computation processor 107, which computes the bearing of a seismic source 101. Although the system is shown in this example embodiment as being implemented with discrete components or modules, other embodiments may employ a degree of integration, where some or all of the functional modules are integrated, for instance, into a common housing or module.

The seismic source 101 can be any object or event of interest that generates seismic energy, such as a person (e.g., walking, running, or otherwise moving), or a vehicle (e.g., moving vehicle or a stationary vehicle such as tank that is actively firing rounds), or an explosion (e.g., discharge of a large millimeter gun), or other such man-made seismic source or event. Natural events, such as a tree falling or mudslide, may also provide seismic source 101. In general, such seismic sources provide unique seismic energy that can be identified.

The distance between the seismic source 101 and the system will vary from application to application. In some embodiments, that range is anywhere from several feet to several hundred miles, depending on factors such as the sensitivity of the geophone 103, type of terrain through which the seismic energy must travel, and the seismic energy generated by the source 101. For instance, seismic activity generated by a person will tend to have lower energy detectable within distances of about 1 mile or less, while seismic activity generated by an earthquake will tend to have relatively higher energy detectable at distances of 100 miles or more. Likewise, seismic energy will propagate different in wet soil based earth as compared to dry rock based earth. The techniques described herein can be employed in numerous such applications, and the range of operation can be set as desired.

The three-axis geophone 103 is this example embodiment is configured to detect seismic energy in the x-axis, the y-axis, and the z-axis, and can be implemented with any commercially available or customized three-axis geophones. Alternatively, the three-axis geophone 103 can be implemented with three individual single-axis geophones that are configured to operate together, so that each of the deployed single axis geophones detects seismic energy from a different axis. In one example embodiment, the geophone 103 is implemented using a Geospace GS-14L3 three-axis geophone. In some such embodiments, accurate bearing angle computations can be achieved at ranges up to 50 meters.

As will be appreciated, the accuracy, sensitivity and range of the geophone will depend on factors such as the given application (e.g., target seismic source and local seismic environment surrounding the geophone), sources of interference (e.g., wind, vehicles, etc), and cost constraints (e.g., greater sensitivity and range typically comes at greater cost). For example, personnel detection at a given range may require a relatively higher sensitivity than heavy vehicle detection at the same range. As sensitivity of seismic transducers improves, such improved transducers can equally be used in embodiments of the present invention.

The A/D converter 104 can be implemented with conventional technology. In one embodiment, the resolution of the A/D converter 104 is in the range of 8 to 32 bits, depending on the desired degree of sensitivity and accuracy. Filter 105 can generally be implemented with any filter technology that isolates the geophone output signals of interest. In one example embodiment, filter 105 is a bandpass filter configured to isolate the geophone output signals and to remove potential sources of interference, such as that arising from acoustical coupling and non-targeted seismic sources within range of the geophone 103. The filter 105 can be coupled to the geophone by insulated wires or coaxial cable or other suitable conventional wired connections (e.g., fiber optic cable or printed circuit board runs, etc). Alternatively, the connection between filter 105 and geophone 103 can be implemented with conventional wireless technology, such as IEEE 802.11, Bluetooth, cellular or satellite based wireless links.

The bearing computation processor 107 receives the filtered outputs of the geophone 103, and operates to compute the bearing of seismic source 101. The bearing computation processor 107, as well as filter 105, can be implemented, for example, in any suitable programming language (e.g., C, C++, object-oriented C, etc), and encoded on a machine readable medium, that when executed by a processor, carries out the bearing computation. The processor may be included, for instance, in a conventional computer system, such as a desktop or laptop. Other suitable processing environments can be used as well, such as a personal digital assistant, smart phone, or any computing device having sufficient memory and processing capability to execute the bearing computation processor 107 code. Other embodiments can be implemented, for instance, with gate-level logic or an application-specific integrated circuit (ASIC) or chip set or other such purpose built logic, or a microcontroller having input/output capability (e.g., inputs for receiving the x, y, and z outputs of the geophone) and a number of embedded routines for carrying out the bearing computation. In short, filter 105 and module 107 can be implemented in hardware, software, or a combination thereof. The coupling between the filter 105 and module 107 can be implemented, for example, with runs on a printed circuit board or optical fiber. The previous discussion with reference to operatively coupling the geophone 103 and the filter 105 is equally applicable here.

Filter and Bearing Computation Processor

Figure 2:
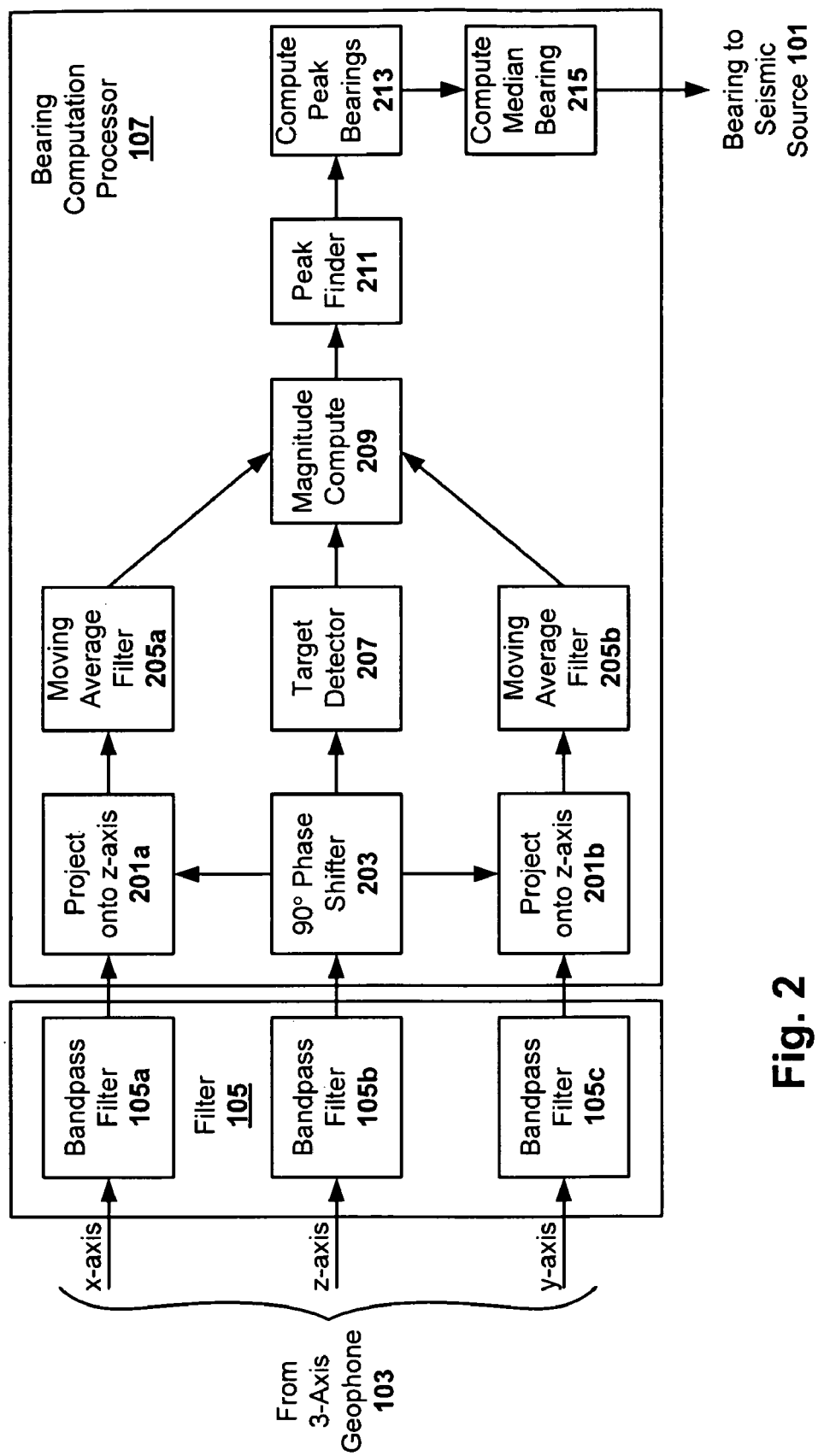
FIG. 2 illustrates the filter and bearing computation module of the system shown in FIG. 1, configured in accordance with an embodiment of the present invention.

FIG. 2 illustrates the filter 105 and bearing computation processor 107 module of the system shown in FIG. 1, configured in accordance with an embodiment of the present invention.

As previously indicated, each of the filter 105 and bearing computation processor 107 can be implemented in hardware, software, or a combination thereof. The block diagram of the example embodiment of FIG. 2 shows individual functional modules to facilitate description and understanding, but other embodiments may integrate functionality of some or all modules into other modules, as will be apparent in light of this disclosure.

As can be seen, the bandpass filter 105 is implemented with a bandpass configuration, including bandpass filters 105a, 105b, and 105c for filter the digitized geophone x-axis, z-axis, and y-axis outputs, respectively. In one such embodiment, each geophone signal is filtered using a bandpass filter having a passband ranging from about 10 Hz to 50 Hz. In one such embodiment, each of bandpass filters 105a, 105b, and 105c is implemented with a 10 to 12 coefficient elliptical IIR filter. Other filter configurations can be used here, however, as long as the desired passband and stopband regions are obeyed. In general, any filter design capable of highlighting or otherwise selectively passing the areas of the geophone's intrinsic frequency response and rejecting undesired noise. Numerous filter types and configurations will be apparent in light of this disclosure, and the present invention is not intended to be limited to any particular one filter or subset of filters. In any such cases, the filter 105 serves to clean the geophone signals and remove sources of interference arising from, for example, acoustical coupling and other such undesired signals.

Module 203 performs a 90° degree phase shift on the vertical (z-axis) signal, which in one example embodiment is carried out using the Hilbert transform. Other suitable phase shift techniques can be employed as well. Modules 201a and 201b operate to project the filtered x and y axis signals, respectively, on to the phase-shifted z axis signal provided by module 203. For instance, and in accordance with one example embodiment, assume H_z is the Hilbert transform of the bandpass filtered z-axis signal of the geophone 103. In addition, assume x is the bandpass filtered x-axis signal of the geophone 103, and y is the bandpass filtered y-axis signal of the geophone 103. In such an embodiment, the projection of x onto z, (x_z) is obtained by pointwise multiplication of H_z with x, where module 201a is configured to implement x_z(t)=H_z(t)*x(t). Similarly, the projection of y onto z (y_z) is obtained by pointwise multiplication of H_z with y, where module 201b is configured to implement y_z(t)=H_z(t)*y(t). Other such suitable projection techniques may be employed.

The projected x and projected y signals output by modules 201a and 201b are each smoothed using moving average filters 205a and 205b, respectively. In one specific embodiment, the moving average filters 205a and 205b are each configured to compute an average over 3/16 of the samples obtained in a 1 second frame (e.g., 192 samples for a signal sampled at 1024 Hz). The ratio of samples per sampling frequency can be decreased or increased as desired, to suit particulars of a given application including typical variations in the seismic signals received from the geophone 103 and the desired degree of smoothing. In general, the length of each filter 205a and 205b is dependent on the sampling rate used when collecting data samples from the geophone 103. For example, and in accordance with another example embodiment, the length of the filter is 96 samples for data sampled at 1024 Hz. In such a case, the filter values implemented by each of filter 205a and 205b are: h(t)=1/(2*96) for all t. Filter 205a is applied to x_z(t) output by module 201a to yield f_x(t), and filter 205b is applied to y_z(t) output by module 201b to yield f_y(t).

Target detector module 207 is configured to apply a detection algorithm to the phase-shifted z-axis signal. In one example embodiment, the target seismic source is a person, and the target detector module 207 is configured to carry out a kurtosis statistical analysis, such as described in "Footstep Detection and Tracking" by Succi, Clapp, Gambert, and Prado (September 2001), which is herein incorporated by reference in its entirety. In general, as a person moves, seismic waves resulting from that person's footsteps propagate through the ground. The seismic waves associated with movement of a person are different from other seismic sources, such as those seismic waves associated with vehicles. For instance, one way to detect footsteps is to look for the periodic impact of each step. The interval between impacts depends on the walker, but a typical interval is about 2 Hz. A distinguishing feature of a footstep when comparing time series data for footsteps to other seismic signatures is the series of sharp spikes (as generated by a seismic sensor such as a geophone) resulting from each impact. This seismic pattern differs from other patterns induced, for example, by the winds over the ground and from vehicle noise. Vehicle noise, for instance, is composed of two parts: a periodic signature at the track impact rate and a broadband signature due to interaction with the random surface features on the ground. The shape of a footstep signature can be quantitatively distinguished from other seismic signatures, by considering a statistical measure of the amplitude of the signature, the kurtosis. Kurtosis is the ratio of the 4th to 2nd moment of the amplitude distribution of the signature. The kurtosis value compared for a sample sequence is much higher in the presence of impulsive events than it is in the presence of Gaussian or sinusoidal signatures. As such, kurtosis statistical analysis of the seismic activity can be used to detect a footstep (or other specific and seismically unique target), even in the presence of other diverse seismic sources. If another kind of man-made source was of interest, the target detector module 207 could be replaced by an appropriate detector for that type of source. In any case, when the seismic source of interest in detected by target detector module 207, then module 207 can effectively enable the formation or computation of a magnitude signal as will now be explained.

The outputs of the x and y moving average filters 205a and 205b are combined to form a magnitude signal by the magnitude compute module 209. This can be accomplished, for example, via a squared summation on a sample-by-sample basis. For instance, and in accordance with one example embodiment, the compute module 209 is configured to compute the magnitude signal m(t) by taking the square root of the sum of f_x(t) squared plus f_y(t) squared, as demonstrated in the equation: $m(t)=sqrt(f\_x(t)^2+f\_y(t)^2)$. As previously discussed, if the target seismic source has not yet been detected (as indicated by module 207), then the magnitude computation can be disabled if so desired (e.g., to conserve processing power).

The magnitude signal output by module 209 is then provided to the peak finder module 211, to determine peak locations in the magnitude signal. In one example embodiment, module 211 receives the magnitude signal m(t), which is then scanned in 4 second buffers to determine the locations of any local peaks (local maxima) in the signal, which finds samples in the magnitude signal m(t) that are larger than both adjacent samples. Numerous other buffer sizes for module 211 can be used as well, depending factors such as duration and type of seismic activity and sampling speed. Other suitable peak detectors can be used as well.

For each identified peak in a buffer, a bearing estimate is computed by module 213. In one embodiment, the module 213 is programmed or otherwise configured to compute the arctangent of the ratio of the x-axis moving average output (as produced by module 205a) to the y-axis moving average output (as produced by module 205b). In more detail, beginning with the largest peak in the magnitude signal m(t), module 213 computes the arc tangent of f_y(t)/f_x(t) at the index corresponding to that peak. After zeroing out a window around the peak (whose size is chosen based on the sampling rate of the geophone signal). In one example such embodiment, the window size is 384 samples. This process is repeated for the next remaining largest peak and again until all viable peaks have been processed.

The bearing estimates are then received by the module 215, which is configured to compute the median bearing estimate (i.e., the bearing estimate that statistically appears the most of all the estimates computed). In one example embodiment, module 215 is configured to collect and sort the bearing estimates into angle order. This sorting process is complete, for instance, when the largest absolute angle difference between any two bearings has been minimized. The median of these sorted angles is then computed by module 215, thereby yielding the final bearing determination for that particular buffer of data. For instance, and in accordance with one example embodiment, module 215 receives a list of peak bearings from module 213, and sorts the bearing list in ascending order. Module 215 then finds the maximum angle difference (recognizing that no angle difference can be greater than 180 degrees). Module 215 then reorders the list of bearings so that the first and last members have the largest difference, and then selects the median bearing of that list. Module 215 can output that median bearing, which is the estimate of the bearing from the geophone 103 to the seismic source 101.

Methodology

Figure 3:
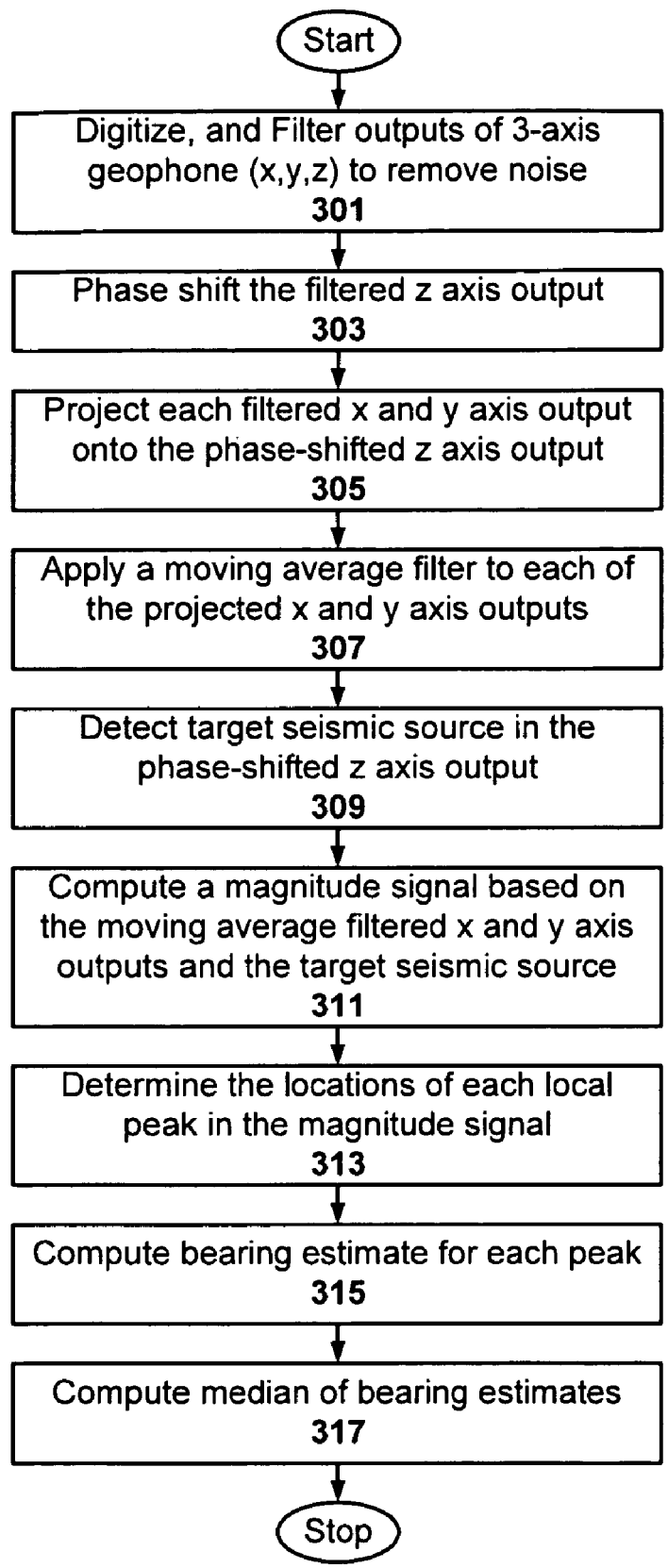
FIG. 3 illustrates a method for computing the bearing from a three-axis geophone to a seismic source, in accordance with an embodiment of the present invention.

FIG. 3 illustrates a method for computing the bearing from a three-axis geophone to a seismic source, in accordance with an embodiment of the present invention. As previously explained, the method can be implemented, for example, in any suitable programming language (e.g., C, C++, object-oriented C, etc), and encoded on a machine readable medium, that when executed by a processor, carries out the bearing computation. The processor may be included in any number of suitable processing environments having sufficient memory and processing capability to execute the code. As previously indicated, each of the methodology can be implemented in hardware, software, or a combination thereof. The block diagram of the example embodiment of FIG. 2 shows individual functional modules to facilitate description and understanding, but other embodiments may integrate functionality of some or all modules into other modules, as will be apparent in light of this disclosure.

The method includes digitizing and then filtering 301 outputs of 3-axis geophone (x,y,z) to remove noise including potential interference sources and other undesired signals. In some embodiments, the digitizing is carried out as described with reference to A/D converter 104, and the filtering is carried out as described with reference to filter 105. Note that in some embodiments, geophone may include an integrated A/D converter so that it three outputs are already digitized. In such cases, the outputs can be provided directly to filter 105.

The method continues with phase shifting 303 the filtered z axis output, and projecting 305 each filtered x and y axis output onto the phase-shifted z axis output. In some embodiments, the phase shifting is carried out as described with reference to module 203, and the projecting is carried out as described with reference to modules 201a and 201b.

The method continues with applying 307 a moving average filter to each of the projected x and y axis outputs. In some embodiments, this filtering is carried out as described with reference to modules 205a and 205b. The method continues with detecting 309 target seismic source in the phase-shifted z axis output, and computing 311a magnitude signal based on the moving average filtered x and y axis outputs. In some embodiments, the detecting is carried out as described with reference to module 207, and the computing is carried out as described with reference to module 209. Recall that is a target seismic source is not detected, then the filtering of 307 and/or computation of 311 may be disabled or otherwise held in abeyance until a target seismic source is detected at 309.

The method continues with determining 313 the locations of each local peak in the magnitude signal, and computing 315 a bearing estimate for each peak. In some embodiments, the peak finding is carried out as described with reference to module 211, and the bearing estimate computation is carried out as described with reference to module 213. The method continues with computing 317 a median of the bearing estimates, which in some embodiments, is carried out as described with reference to compute median bearing module 215. The resulting median bearing is the estimate of the bearing from the geophone to a seismic source (e.g., person).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for computing the bearing from a three-axis geophone to a seismic source, comprising:
   receiving outputs from a three-axis geophone, including x axis, y axis and z axis outputs;
   phase shifting the z axis output;
   in response to detecting a target seismic source in the phase-shifted z axis output, computing a magnitude signal based on the x and y axis outputs;
   determining locations of each local peak in the magnitude signal;
   computing a bearing estimate for each peak; and
   computing a median of the bearing estimates, wherein the resulting median bearing is an estimate of the bearing from the geophone to the target seismic source.

2. The method of claim 1 wherein the x axis, y axis and z axis outputs are analog, and receiving the outputs from a three-axis geophone further includes digitizing each of the x, y, and z outputs.

3. The method of claim 1 further comprising:
   filtering each of the x, y, and z outputs to remove noise.

4. The method of claim 3 wherein the phase shifting comprises phase shifting the filtered z axis output, the method further comprising:
   projecting each filtered x and y axis output onto the phase-shifted z axis output.

5. The method of claim 1 further comprising:
   projecting each x and y axis output onto the phase-shifted z axis output.

6. The method of claim 5 further comprising:
applying a moving average filter to each of the projected x and y axis outputs.

7. The method of claim 6 wherein computing a magnitude signal based on the x and y axis outputs comprises computing the magnitude signal based on the moving average filtered x and y axis outputs;

8. The method of claim 4 further comprising:
applying a moving average filter to each of the projected x and y axis outputs, wherein computing a magnitude signal comprises computing the magnitude signal based on the moving average filtered x and y axis outputs.

9. A non-transitory machine readable medium encoded with instructions that when executed by a processor, cause that processor to carry out a process for computing the bearing from a three-axis geophone to a seismic source, the process comprising:
receiving outputs from a three-axis geophone, including x axis, y axis and z axis outputs;
phase shifting the z axis output;
in response to detecting a target seismic source in the phase-shifted z axis output, computing a magnitude signal based on the x and y axis outputs;
determining locations of each local peak in the magnitude signal;
computing a bearing estimate for each peak; and
computing a median of the bearing estimates, wherein the resulting median bearing is an estimate of the bearing from the geophone to the target seismic source.

10. The machine readable medium of claim 9 wherein the received x axis, y axis and z axis outputs are digitized.

11. The machine readable medium of claim 9, the process further comprising:
filtering each of the x, y, and z outputs to remove noise.

12. The machine readable medium of claim 11 wherein the phase shifting comprises phase shifting the filtered z axis output, the process further comprising:
projecting each filtered x and y axis output onto the phase-shifted z axis output.

13. The machine readable medium of claim 9, the process further comprising:
projecting each x and y axis output onto the phase-shifted z axis output.

14. The machine readable medium of claim 13, the process further comprising:
applying a moving average filter to each of the projected x and y axis outputs.

15. The machine readable medium of claim 14 wherein computing a magnitude signal based on the x and y axis outputs comprises:
computing the magnitude signal based on the moving average filtered x and y axis Outputs.

16. The machine readable medium of claim 12, the process further comprising:
applying a moving average filter to each of the projected x and y axis outputs, wherein computing a magnitude signal comprises computing the magnitude signal based on the moving average filtered x and y axis outputs.

17. A system for computing the bearing from a three-axis geophone to a seismic source, comprising:
a filter for receiving outputs from a three-axis geophone, including x axis, y axis and z axis outputs, and filtering each of the x, y, and z outputs to remove noise;
a phase shifter for phase shifting the filtered z axis output;
a projector for projecting each filtered x and y axis output onto the phase-shifted z axis output;
a moving average filter for filtering each of the projected x and y axis outputs;
a magnitude compute module for computing a magnitude signal based on the moving average filtered x and y axis outputs;
a peak finder for determining locations of each local peak in the magnitude signal;
a bearing compute module for computing a bearing estimate for each peak; and
a bearing estimate compute module for computing a median of the bearing estimates, wherein the resulting median bearing is an estimate of the bearing from the geophone to a target seismic source.

18. The system of claim 17 wherein the x axis, y axis and z axis outputs are analog, and the system further comprise an analog-to-digital converter for digitizing each of the x, y, and z outputs.

19. The system of claim 17 further comprising:
a detector for detecting the target seismic source in the phase-shifted z axis output;
wherein in response to detecting a target seismic source in the phase-shifted z axis output, the magnitude compute module is enabled to compute a magnitude signal based on the moving average filtered x and y axis outputs.

20. The system of claim 17 wherein the filter for filtering each of the x, y, and z outputs to remove noise includes three a bandpass filter for each of the x, y, and z outputs.

* * * * *